United States Patent
McLisky

(10) Patent No.: US 8,740,015 B2
(45) Date of Patent: Jun. 3, 2014

(54) SPRAY DISPENSER ACTIVATED BY SENSED LIGHT LEVEL

(75) Inventor: Nigel Haig McLisky, Auckland (NZ)

(73) Assignee: S.C. Johnson & Son, Inc., Racine, WI (US)

( * ) Notice: Subject to any disclaimer, the term of this patent is extended or adjusted under 35 U.S.C. 154(b) by 1150 days.

(21) Appl. No.: 11/371,740

(22) Filed: Mar. 9, 2006

(65) Prior Publication Data

US 2006/0191955 A1     Aug. 31, 2006

(51) Int. Cl.
     *B65D 83/26*     (2006.01)
(52) U.S. Cl.
     USPC .............................. 222/52; 222/649; 222/645
(58) Field of Classification Search
     USPC ............... 222/52, 646, 649, 23, 645, 644, 15, 222/504, 333; 239/1, 69, 70, 332
     See application file for complete search history.

(56) References Cited

U.S. PATENT DOCUMENTS

| | | | |
|---|---|---|---|
| 3,351,240 A | 11/1967 | Gray | |
| 3,666,144 A | 5/1972 | Winder | |
| 4,063,664 A * | 12/1977 | Meetze, Jr. | 222/648 |
| RE34,847 E * | 2/1995 | Muderlak et al. | 222/25 |
| 5,397,028 A | 3/1995 | Jesadanont | |
| 5,417,258 A | 5/1995 | Privas | |
| 5,673,825 A * | 10/1997 | Chen | 222/646 |
| 5,772,074 A * | 6/1998 | Dial et al. | 222/1 |
| 6,216,925 B1 | 4/2001 | Garon | |
| 6,267,297 B1 * | 7/2001 | Contadini et al. | 239/1 |
| 6,769,580 B2 * | 8/2004 | Muderlak et al. | 222/646 |
| 6,877,636 B2 | 4/2005 | Speckhart et al. | |
| 6,974,091 B2 * | 12/2005 | McLisky | 239/302 |
| 2004/0074935 A1 * | 4/2004 | Chon | 222/646 |
| 2007/0199952 A1 * | 8/2007 | Carpenter et al. | 222/52 |

FOREIGN PATENT DOCUMENTS

| | | |
|---|---|---|
| CH | 681038 | 12/1992 |
| DE | 3902476 | 8/1990 |
| EP | 0038598 | 10/1981 |
| EP | 274 785 | 7/1988 |
| FR | 2292528 | 6/1976 |
| FR | 2433983 | 3/1980 |
| FR | 2523479 | 9/1983 |
| FR | 2717156 | 9/1995 |
| GB | 2 172 125 | 9/1986 |
| GB | 2 248 888 | 4/1992 |

(Continued)

OTHER PUBLICATIONS

U.S. Appl. No. 10/416,170, Office Action dated Aug. 24, 2004.

(Continued)

*Primary Examiner* — Kevin P Shaver
*Assistant Examiner* — Robert Nichols, II

(57) ABSTRACT

A dispenser incorporates, or can receive, a containment portion holding a quantity of dispensable material (e.g., a pesticide). The dispenser has an indicator and a sensor, which can sense a level of light in an environment immediately surrounding the dispenser. The dispenser is formed such that when it is in use it can be set to dispense the dispensable material in response to the sensor sensing a predetermined level of light. The dispenser is formed such that once it is activated to dispense the dispensable material it cannot be deactivated until the dispensable material has been dispensed in accordance with settings of the dispenser, and when the dispensable material has been dispensed in accordance with the settings the indicator indicates that this has occurred.

16 Claims, 2 Drawing Sheets

(56) References Cited

FOREIGN PATENT DOCUMENTS

Figure 1:
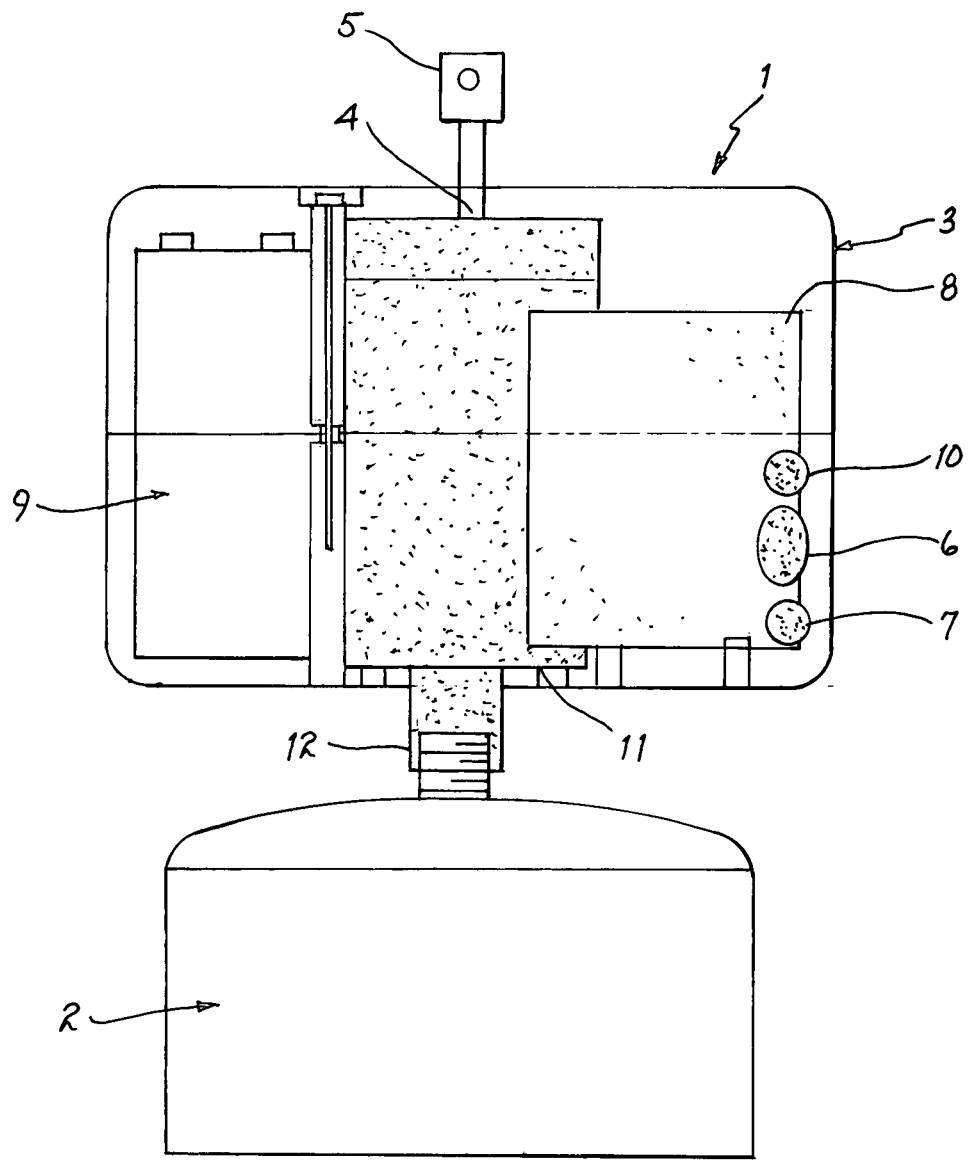

| JP | 6-170286 | 6/1994 |
| JP | 2000-70797 | 3/2000 |
| JP | 2002113398 | 4/2002 |
| WO | WO 95/29106 | 11/1995 |
| WO | WO 01/26448 A1 | 4/2001 |
| WO | WO 02/40376 | 5/2002 |

OTHER PUBLICATIONS

U.S. Appl. No. 10/416,170, Office Action dated Jan. 27, 2005.
U.S. Appl. No. 10/416,170, Office Action dated Apr. 25, 2005.
U.S. Appl. No. 10/416,170, Office Action dated Aug. 8, 2005.
U.S. Appl. No. 10/416,170, Office Action dated Feb. 15, 2006.
U.S. Appl. No. 10/416,170, Office Action dated Oct. 5, 2006.
U.S. Appl. No. 10/416,170, Office Action dated Jan. 30, 2007.
U.S. Appl. No. 10/516,326, Office Action dated Oct. 9, 2007.
U.S. Appl. No. 10/416,170, Office Action dated Mar. 19, 2008.
U.S. Appl. No. 10/416,170, Office Action dated Apr. 14, 2008.
U.S. Appl. No. 10/416,170, Office Action dated Jun. 23, 2008.
U.S. Appl. No. 10/516,326, Office Action dated Jul. 8, 2008.
U.S. Appl. No. 10/516,326, Office Action dated Sep. 30, 2008.
U.S. Appl. No. 10/516,326, Office Action dated Nov. 13, 2008.

* cited by examiner

SPRAY DISPENSER ACTIVATED BY SENSED LIGHT LEVEL

FIELD OF INVENTION

This invention relates to a dispenser. A preferred form of the invention relates to a dispenser for automatically dispensing a spray into an atmosphere within a freight container or other freight receptacle.

BACKGROUND

In the freight industry it is common to transport goods and other materials across international borders. This may be achieved by way of sea, land, or air, with suitable freight containers. There is a need for biosecurity when freighting goods and other materials internationally, i.e. in order to prevent or minimise the risk of insects, animals, or other living organisms undesirably transferring from one country to another. It is accordingly an object of at least one form of the present invention to go at least some way towards addressing the need for biosecurity within the freight industry, or alternatively to provide the public with a useful choice.

SUMMARY OF THE INVENTION

According to one aspect of the invention there is provided a dispenser which incorporates, or which can receive, a containment portion holding a quantity of dispensable material, the dispenser having indicator means, and sensing means which can sense a level of light in an environment immediately surrounding the dispenser, the dispenser being formed such that when it is in use it can be set to dispense the dispensable material in response to the sensing means sensing a predetermined level of light; the dispenser being formed such that once it is activated to dispense the dispensable material it cannot be deactivated until the dispensable material has been dispensed in accordance with settings of the dispenser, and wherein when the dispensable material has been dispensed in accordance with the settings the indicator means indicates that this has occurred.

Optionally the indicator means comprises a light.

Optionally the dispenser is formed so that the containment means cannot be removed from the dispenser once fitted thereto.

Optionally the dispenser can be set to dispense the dispensable material when the sensing means senses a substantial absence of light.

Optionally the dispenser can be set to dispense the dispensable material when the sensing means senses a level of light characteristic of the environment within a closed windowless freight container.

Optionally the dispenser has a valve arranged to control a flow of the dispensable material from the containment portion to an outside area.

Optionally the dispenser can be set by an operator to automatically dispense the dispensable material at timed intervals.

Optionally the sensing means serves to prevent dispensing of the dispensable material when the dispenser is not in a substantially dark environment.

Optionally the dispensable material is a material which can be sprayed by the dispenser.

Optionally the dispensable material is suitable for destroying or repelling insects, micro-organisms, or rodents.

Optionally the dispensable material is or comprises an odour neutraliser or sanitiser.

Optionally the dispensable material is of a type which readily breaks down as a result of exposure to daylight (eg sunlight).

Optionally the dispenser incorporates the containment portion.

Optionally the containment portion is releasable from the dispenser or from the rest of the dispenser.

Optionally the dispenser is portable to the extent that it can be carried by hand.

Optionally the dispenser has mounting means for fixing it to a wall or structural support. The mounting means may involve a self adhesive portion and/or a bracket.

Optionally the dispenser has a warning light which indicates when the dispenser is activated or has dispensed the dispensable material.

According to another aspect of the invention there is provided a method of treating a freight container, involving the steps of:

i) arranging or leaving a dispenser in the container wherein the dispenser is of a type which can sense light within the container and emit a dispensable material in the container only when the light is below a predetermined level, ii) activating the dispenser or leaving it activated if it is already activated, iii) closing the container so that there is less light within the container than when the container is open, the amount of light within the closed container being below the predetermined level, and iv) allowing the dispenser to automatically release the dispensable material (eg a pesticide) within the container at timed intervals.

Optionally the dispenser is of a type which cannot be deactivated once it is activated until a pre-set dispensing cycle of the dispensable material has completed.

Optionally the dispenser has any of the individual features mentioned prior to the method aspect, or any combination(s) of these.

BRIEF DESCRIPTION OF THE DRAWINGS

Some preferred forms of the invention will now be described by way of example and with reference to the accompanying drawings, or which:

FIG. 1 is a cross section view showing part of a dispenser,

FIG. 2 is a cross section view showing detail of part of the dispenser, and

FIG. 3 shows a freight container of a type suitable for use with the invention.

DETAILED DESCRIPTION

Referring to FIGS. 1 and 2, a preferred form of the invention comprises a dispenser 1 which can be fitted to an aerosol canister 2. The canister 2 contains a quantity of a light sensitive agrochemical, for example a suitable pesticide. The canister 2 is screw fitted to the dispenser 1, and can be subsequently released and replaced when empty.

The dispenser 1 comprises an outer housing 3 having an aperture 4 connected to a fluid spray nozzle 5. When the dispenser releases a spray of the pesticide it proceeds from the nozzle 5. An activation switch 6 is provided to turn the dispenser on or off.

The dispenser 1 has a light sensing switch 7 electrically connected to a circuit board 8 and power supply in the form of a battery 9. An LED warning light 10 flashes when the invention is switched on. The dispenser also contains a solenoid valve 11 connected to the canister 2 by way of a valve extension 12. The light sensing switch 7, the circuit board 8, the LED warning light 10, and the valve 11 are all powered by the battery 9.

When the dispenser is turned "on" the light sensing switch 7 senses the level of light in the immediately surrounding environment. Typically a freight container is dark inside when its door is closed. On sensing a dark condition the switch sends a signal which is processed by the circuit board 8. In relation to the sensing switch 7, it should be understood that the term "dark" is not intended to only convey a total absence of light. The term should be taken as also embracing dim light conditions. The dispenser 1 may thus function in conditions which are less than pitch black. On receiving the signal from the light sensing switch 7 the circuit board 8 causes the valve 11 to open and close at predetermined intervals. Each time the valve opens a quantity of the pesticide proceeds from the canister 2, through the dispenser 1, and into the atmosphere. This may continue for a preset period of time or until the canister is exhausted. The dispenser 1 can thus sanitise a container while it is in transit to eradicate undesired life forms within the container.

Preferably the dispenser 1 is such that once turned on for dispensing it cannot be turned off until it has completed a pre-set cycle of dispensing. Once the cycle is complete an indication is given, for example a particular colour of light is emitted by the warning light 10. All of this prevents the dispenser 1 from being deliberately or inadvertently deactivated before it has completed a dispensing cycle and has thus done its work within the container. The canister 2 may be such that once it is fitted to the dispenser it cannot be removed—i.e. to reduce the likelihood of deliberate or inadvertent interference with the dispensing cycle.

In some forms of the invention a removable bar code label may be included wherein the bar code gives details of the contents of the canister 2. The label can be removed from the canister 2, or from the dispenser 1 generally, and can be scanned by authorities to make sure that the correct dispensable material has been used and that the container has thus been properly treated.

The life forms treated by the dispenser may be microorganisms, insects (including spiders), mice, rats, snakes, etc. The dispenser may thus substitute more expensive and traditional container fumigation techniques. On sensing a high level of light, for example when the container door is opened, the sensing switch 7 causes the dispenser 1 to stop dispensing.

Figure 3:
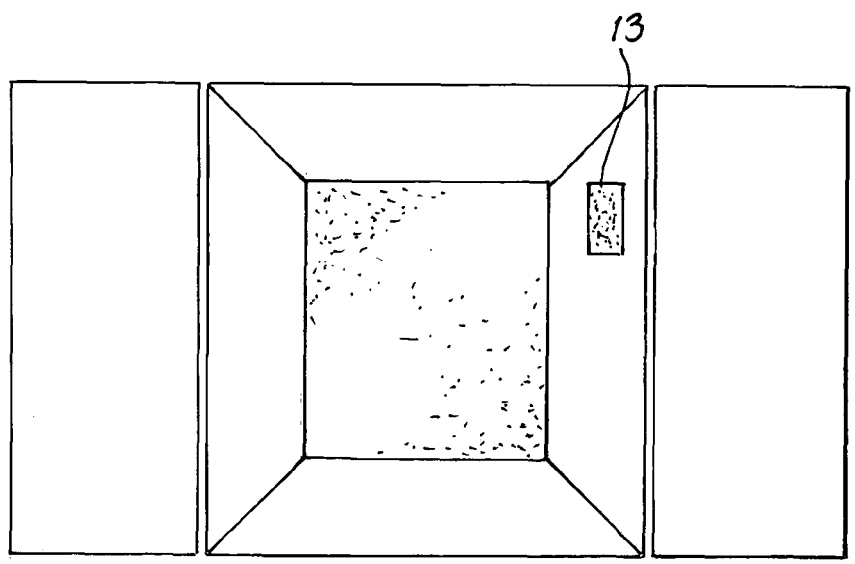

When the dispenser is in use it may be fitted to the wall of a freight container, for example of the type shown in FIG. 3 and at the position demonstrated at 13. The dispenser 1 and canister 2 may be fitted by way of a self adhesive portion or by way of a suitable bracket. If desired, the dispenser may be placed at ground level or at any other part of the container as appropriate.

Figure 2:
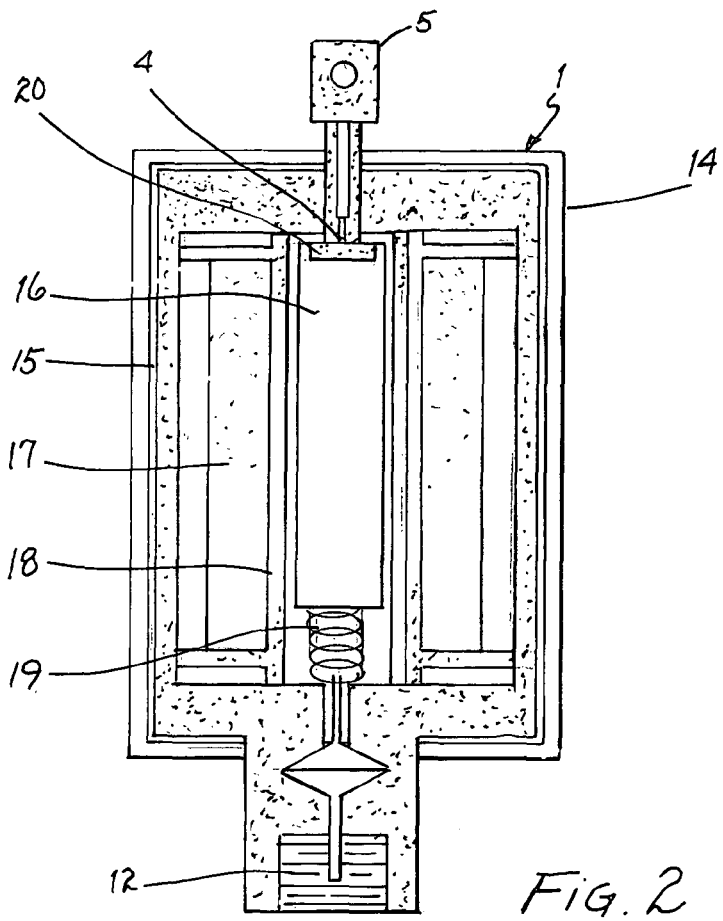

FIG. 2 provides additional detail of the dispenser valve 11. As shown, the valve 11 has a plastic housing 14, a steel inner container 15, an armature 16, electrical bobbin windings 17, a plastic bobbin 18, a spring 19, and a rubber valve seat 20. When a current passes through the windings 17 the armature moves away from the valve seat 20 to enable spray material to escape via the spray nozzle 5. The spring 19 causes the armature to return to a sealed position when current ceases to flow in the winding 17. The steel container 15 serves to enhance the magnetic field produced within the valve In preferred forms of the invention the dispenser 1 may involve the following features, either alone or in any desired combination:

(a) The ability to spray pesticide in very fine droplet sizes able to permeate most or all of the unoccupied area within a shipping container. Dispersal of the spray may be facilitated by way of convection air currents which can naturally occur within a shipping container. This enables pesticide, etc, to reach insects or other pests hidden within the cargo.

(b) The ability to release pesticide, etc, as a fine spray which evaporates almost immediately on leaving the spray nozzle 5. When this occurs the pesticide, etc, molecules are free to fill the vacant space within the shipping container by way of Brownian movement. This also assists the pesticide to reach insects or the like hidden within the cargo.

(c) The ability to release pesticide in only dark conditions facilitates the use of non-residual pesticidal chemicals, for example natural pyrethrins and some pyrethroids. These chemicals are generally unstable in light and therefore are more effective in the dark. These chemicals are also rapidly broken down in natural light, for example sunlight, when the shipping containers are opened at the destination. The chemicals may thus be non-residual and safe for people unloading shipping containers or using the same containers in the future.

(d) The choice of non-residual, light sensitive pesticides or other chemicals, for example if the cargo comprises foodstuffs or other horticultural products. Preferably the pesticides, etc, are chosen for an ability to break down to harmless substances within a few hours in light conditions.

(e) The ability to dispense automatically enables a regular timed release of pesticide to kill hatching insects, moving insects, etc.

(f) The ability to effect automatic sprayed emissions of the pesticide for a period of 1 to 26 weeks without the need for human intervention once the dispenser is set.

(g) Full portability so that the dispenser can be placed virtually anywhere within a shipping container.

(h) The use of a low voltage battery electronic circuit to minimise the risk of fire damage to the contents of a container.

(i) The ability for use as a single trip dispenser or one which can be recovered and re-used.

(j) Portability which facilitates use of multiple dispensers within a shipping container depending on the expected level of infestation, risk of hazardous pests, and container size.

(k) The ability for use with various aerosol canister formulations for different needs. Various canisters may be numerically coded to enable ready compliance with biosecurity requirements for different types of cargo. A loading or shipping supervisor can easily select the appropriate aerosol canister by its number and can fit it to a dispenser for use in a shipping container. This aerosol canister code is then able to be checked by the destination bio-security department, and if it is incorrect the shipping container may be closed and fumigated in a conventional way.

In preferred forms of the invention its users may enjoy commercial benefits over at least some traditional container fumigation techniques, including operational savings, reduced levels of chemicals in the atmosphere, reduced labour costs, and a lessor requirement for storing and mixing potentially hazardous concentrated agrichemicals.

Those skilled in the art will appreciate that preferred forms of the invention address traditional delays associated with holding shipping containers at port for either fumigation or full inspections, and commercial costs directly associated with extra storage, extra fumigation, inspections, etc. The use of the invention may reduce Government costs for effective bio-security at borders.

Preferably the dispenser is formed so that the duration of each burst of spray can be regulated. The dispenser may also allow for the delay between each timed burst to be regulated.

Some embodiments the invention involve the use of light sensitive safe pesticides, with canister aerosol pressure provided by non-toxic and non-flammable propellant chemicals. Alternatively a "bag in a can" system may be employed. The dispensable materials used with the invention may be in liquid or gas form. The materials may be dissolved of dispersed in a liquid or gaseous phase to be dispensed as a spray in a controlled and continuous flow within and throughout a sea freight or airfreight container.

While the invention has been described by way of example, it should be appreciated that modifications or improvements can occur without departing from the scope of the appended claims.

The invention claimed is:

1. A dispenser adapted to receive a containment portion holding a quantity of dispensable material, the dispenser having a circuit board, an indicator means, a valve adapted to be connected to the containment portion, and sensing means that senses a level of light in an environment immediately surrounding the dispenser, wherein the circuit board controls dispensing of the dispensable material by a cycle of dispensing that includes opening and closing the valve at predetermined intervals and the sensing means is electrically connected to the circuit board, wherein the circuit board is activated in response to a signal transmitted to the circuit board in response to the sensing means sensing a predetermined level of light such that once the circuit board is activated in response to the signal it cannot be deactivated until the dispensable material has been dispensed in accordance with the cycle, and wherein when the dispensable material has been dispensed in accordance with the cycle the indicator means indicates that this has occurred.

2. A dispenser according to claim 1, wherein the dispenser emits the dispensable material when the sensing means senses a substantial absence of light.

3. A dispenser according to claim 1, wherein the dispenser can be set to dispense the dispensable material when the sensing means senses a level of light characteristic of the environment within a closed windowless freight container.

4. A dispenser according to claim 1, wherein the valve adapted to be connected to the containment portion comprises a solenoid valve adapted to be disposed over an outlet of the containment portion and arranged to control a flow of the dispensable material from the containment portion to an outside area.

5. A dispenser according to claim 1, wherein the dispenser can be set to dispense the dispensable material when the sensing means senses a level of light characteristic of the environment within a closed windowless freight container, and wherein the cycle of the dispenser can be set by an operator to automatically dispense the dispensable material at the predetermined intervals.

6. A dispenser according to claim 1, wherein the sensing means serves to prevent dispensing of the dispensable material when the dispenser is not in a substantially dark environment.

7. A dispenser according to claim 1, wherein the sensing means serves to prevent dispensing of the dispensable material when the dispenser is not in a substantially dark environment, and wherein the dispensable material is a material sprayed by the dispenser.

8. A dispenser according to claim 1, wherein the dispensable material is suitable for destroying or repelling insects, micro-organisms, or rodents.

9. A dispenser according to claim 1, wherein the dispensable material is or comprises an odor neutralizer.

10. A dispenser according to claim 1, wherein the dispensable material is of a type which readily breaks down as a result of exposure to daylight.

11. A dispenser according to claim 1, wherein the dispenser incorporates the containment portion.

12. A dispenser according to claim 11, wherein the containment portion is releasable from the dispenser via a screw fitting.

13. A dispenser according to claim 1, wherein the dispenser has mounting means for fixing it to a wall or structural support.

14. A dispenser according to claim 1, wherein the indicator means comprises a light which indicates when the dispenser is activated and/or has dispensed the dispensable material.

15. A dispenser adapted to receive a containment portion holding a quantity of dispensable material, the dispenser having a circuit board, an indicator means, a valve adapted to be connected to the containment portion, and sensing means that senses a level of light in an environment immediately surrounding the dispenser, wherein the circuit board controls dispensing of the dispensable material by a cycle of dispensing that includes opening and closing the valve at predetermined intervals and the sensing means is electrically connected to the circuit board, wherein the circuit board is activated in response to a signal transmitted to the circuit board in response to the sensing means sensing a predetermined level of light;

the dispenser including a setting which, when set, causes the dispenser to dispense the dispensable material as a spray able to destroy or repel insects, micro-organisms, or rodents when the sensing means senses a substantial absence of light, and wherein the sensing means and circuit board serve to prevent dispensing of the dispensable material when the dispenser is not in a substantially dark environment, such that once the circuit board is activated in response to the signal it cannot be deactivated until the dispensable material has been dispensed in accordance with the cycle, and wherein when the dispensable material has been dispensed in accordance with the cycle the indicator means indicates that this has occurred.

16. A dispenser according to claim 15, wherein the indicator means comprises a light which indicates when the dispenser has dispensed the dispensable material.

\* \* \* \* \*